United States Patent
Waskiewicz, Jr. et al.

(10) Patent No.: US 12,457,277 B2
(45) Date of Patent: *Oct. 28, 2025

(54) TECHNOLOGIES FOR PROGRAMMING FLEXIBLE ACCELERATED NETWORK PIPELINE USING EBPF

(71) Applicant: Intel Corporation, Santa Clara, CA (US)

(72) Inventors: Peter P. Waskiewicz, Jr., Portland, OR (US); Anjali Singhai Jain, Portland, OR (US); Neerav Parikh, Hillsboro, OR (US); Parthasarathy Sarangam, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 326 days.

This patent is subject to a terminal disclaimer.

(21) Appl. No.: 18/213,514

(22) Filed: Jun. 23, 2023

(65) Prior Publication Data

US 2023/0362284 A1   Nov. 9, 2023

Related U.S. Application Data

(63) Continuation of application No. 17/741,332, filed on May 10, 2022, now Pat. No. 11,743,367, which is a
(Continued)

(51) Int. Cl.
*H04L 69/22* (2022.01)
*H04L 41/00* (2022.01)

(52) U.S. Cl.
CPC ............ *H04L 69/22* (2013.01); *H04L 41/24* (2013.01)

(58) Field of Classification Search
None
See application file for complete search history.

(56) References Cited

U.S. PATENT DOCUMENTS 7,689,702 B1   3/2010   Tripathi et al.
8,285,881 B2 * 10/2012   Elzur ............... H04L 47/125
                                                                 709/250
(Continued)

OTHER PUBLICATIONS

Anand, Pratyush, "An intro to using eBPF to filter packets in the Linux kernal," Sep. 11, 2017, pp. 1-10, retrieved from the internet: https://opensource.com/article/17/9/intro-ebpf.
(Continued)

*Primary Examiner* — Mohamed Ibrahim
(74) *Attorney, Agent, or Firm* — Essential Patents Group, LLP; Christopher K. Gagne

(57) ABSTRACT

Technologies for programming flexible accelerated network pipelines include a comping device with a network controller. The computing device loads a program binary file that includes a packet processing program and a requested hint section. The binary file may be an executable and linkable format (ELF) file with an extended Berkeley packet filter (eBPF) program. The computing device determines a hardware configuration for the network controller based on the requested offload hints and programs the network controller. The network controller processes network packets with the requested offloads, such as packet classification, hashing, checksums, traffic shaping, or other offloads. The network controller returns results of the offloads as hints in metadata. The packet processing program performs actions based on the metadata, such as forwarding, dropping, packet modification, or other actions. The computing device may compile an eBPF source file to generate the binary file. Other embodiments are described and claimed.

20 Claims, 7 Drawing Sheets

Related U.S. Application Data continuation of application No. 16/648,750, filed as application No. PCT/US2018/050204 on Sep. 10, 2018, now Pat. No. 11,336,756.

(60) Provisional application No. 62/582,210, filed on Nov. 6, 2017.

(56) References Cited

U.S. PATENT DOCUMENTS

| | | | |
|---|---|---|---|
| 9,891,898 | B1 | 2/2018 | Tonsing |
| 2004/0243723 | A1 | 12/2004 | Davis et al. |
| 2005/0086349 | A1* | 4/2005 | Subramaniyan .......... G06F 9/50 709/230 |
| 2005/0122980 | A1 | 6/2005 | Anand et al. |
| 2007/0156919 | A1 | 7/2007 | Potti et al. |
| 2007/0195814 | A1 | 8/2007 | Barrie et al. |
| 2007/0233886 | A1* | 10/2007 | Fan .................. H04L 69/321 709/230 |
| 2008/0126622 | A1 | 5/2008 | Tamir et al. |
| 2008/0271134 | A1 | 10/2008 | Johnson et al. |
| 2009/0089351 | A1* | 4/2009 | Belgaied ............ H04L 49/9063 709/201 |
| 2009/0141634 | A1 | 6/2009 | Rothstein et al. |
| 2010/0131669 | A1 | 5/2010 | Srinivas et al. |
| 2011/0274108 | A1 | 11/2011 | Fan |
| 2012/0230202 | A1 | 9/2012 | Reed |
| 2013/0227556 | A1 | 8/2013 | Tsirkin et al. |
| 2013/0235868 | A1 | 9/2013 | Owens et al. |
| 2013/0254436 | A1 | 9/2013 | Chhabra et al. |
| 2015/0295833 | A1* | 10/2015 | Mizukoshi ............ H04L 45/306 370/235 |
| 2016/0182408 | A1* | 6/2016 | Jani .................. H04L 12/56 370/474 |
| 2016/0342547 | A1 | 11/2016 | Liss et al. |
| 2017/0180273 | A1 | 6/2017 | Daly et al. |
| 2017/0237640 | A1 | 8/2017 | Stocker |
| 2017/0346933 | A1 | 11/2017 | Pope et al. |
| 2017/0353384 | A1 | 12/2017 | Chayat et al. |
| 2018/0288198 | A1 | 10/2018 | Pope et al. |
| 2018/0321963 | A1 | 11/2018 | Amit et al. |
| 2019/0020546 | A1 | 1/2019 | Bhandarkar et al. |
| 2019/0140983 | A1 | 5/2019 | Tu et al. |
| 2019/0306109 | A1 | 10/2019 | Masputra et al. |
| 2019/0325302 | A1 | 10/2019 | Savic et al. |
| 2020/0028785 | A1 | 1/2020 | Ang et al. |
| 2020/0259763 | A1 | 8/2020 | Bernat et al. |

OTHER PUBLICATIONS

Extended European Search Report for European Patent Application No. 20208788.8, dated May 17, 2021.
Extended European Search Report for European Patent Application No. 20208791.2, dated May 20, 2021.
Extended European Search Report for Patent Application No. 19182455.6, mailed Dec. 12, 2019, 10 pages.
Final Office Action from U.S. Appl. No. 17/868,391 notified Jan. 8, 2024, 25 pgs.
Fleming, M., A thorough introduction to eBPF, https://lwn.net/Articles/740157; Dec. 2, 2017; (year: 2017).
International Search Report and Written Opinion from PCT/US2018/050204 notified Jan. 7, 2019.
Kincinski, J., et al., "eBPF Hardware Offload to SmartNICs: cls_bpf and XDP," Netdev 1.2, Netronome Systems, Cambridge, UK, Netconf, Oct. 2016, 6 pages.
Kumar, K., et al., sNICh: Efficient last hop networking in the data center, Architectures for Networking and Communications Systems (ANCS), 2010.
Non-Final Office Action for U.S. Appl. No. 16/058,773, notified Mar. 10, 2020.
Non-Final Office Action from U.S. Appl. No. 16/648,750 notified Jul. 29, 2021, 20 pgs.
Non-Final Office Action from U.S. Appl. No. 17/741,332 notified Dec. 12, 2022, 14 pgs.
Non-Final Office Action from U.S. Appl. No. 17/868,391 notified Jul. 21, 2023, 20 pgs.
Notice of Allowance for U.S. Appl. No. 16/058,773, dated Apr. 27, 2020.
Notice of Allowance for U.S. Appl. No. 16/058,773, mailed Apr. 13, 2020.
Notice of Allowance for U.S. Appl. No. 16/933,121, dated Jun. 24, 2022.
Notice of Allowance for U.S. Appl. No. 17/032,623, dated Jun. 28, 2022.
Notice of Allowance from U.S. Appl. No. 16/648,750 notified Jan. 25, 2022, 9 pgs.
Notice of Allowance from U.S. Appl. No. 17/868,391 notified Apr. 22, 2024, 6 pgs.
Notice of Allowance from U.S. Appl. No. 18/213,514 notified Apr. 4, 2023, 8 pgs.
Office Action for European Patent Application No. 19182455.6, dated Dec. 9, 2020.
Office Action for European Patent Application No. 20208788.8, dated Jan. 25, 2023.
Office Action for European Patent Application No. 20208791.2 dated Jan. 27, 2023.
Office Action for U.S. Appl. No. 16/933,121, dated Jan. 7, 2022.
Office Action for U.S. Appl. No. 17/032,623, dated Feb. 16, 2022.
Office Action from European Patent Application No. 20208788.8 notified Sep. 16, 2024, 13 pgs.
Office Action from European Patent Application No. 20208791.2 notified Sep. 16, 2024, 13 pgs.
Pirko, Jiri, "[patch net-next 00/34] net: sched: allow qdiscs to share filter block instances," https://lore.kernel.org/netdev/20171012171823.1431-1-jiri@resnulli.us/, email dated Oct. 12, 2017, 12 pgs.

* cited by examiner

```
/* Hash offload in hardware */
struct bpf_hw_hints_def SEC("hw hints") rx_hash = {
    .type = RSS_HASH,
    .size = sizeof(__u32),
    /* this combined with the mask defines
     * the hash fields */
    .fields = { INNER_L3_SRC, INNER_L4_SRC },
    .mask = { 0x00ffff, 0xffff },
    .key = { xyz123 },
};

/* Parsing hint */
struct bpf_hw_hints_def SEC("hw hints") rx_offset = {
    .type = PACKET_OFFSET_INNER_L4,
    .size = sizeof(__u16),
};

/* Flow lookup */
struct bpf_hw_hints_def SEC("hw hints") rx_match = {
    .type = PACKET_MATCH,
    .fields = {PTYPE, INNER_L3_SRC, INNER_L4_SRC},
    .mask = { 0xff, 0.0.ff.ff, 0xffff },
    .value = { 0x10, 10.10.20.2, 65 },
    /* This hints adds a match rule into hardware,
     * which creates a software-defined result when
     * hardware finds a match */
    .result = 25
    .size = sizeof(__u32),
};
```

FIG. 5

TECHNOLOGIES FOR PROGRAMMING FLEXIBLE ACCELERATED NETWORK PIPELINE USING EBPF

CLAIM OF PRIORITY

This application is a continuation of U.S. patent application Ser. No. 17/741,332, filed May 10, 2022, which is a continuation of U.S. patent application Ser. No. 16/648,750, filed Mar. 19, 2020, which is a national stage entry under 35 U.S.C. § 371(b) of International Application No. PCT/US2018/050204, filed Sep. 10, 2018, which claims the benefit of and priority to U.S. Provisional Application No. 62/582,210, filed Nov. 6, 2017. The entire specifications of which are incorporated herein by reference in their entirety.

BACKGROUND

Certain computing devices perform network packet filtering using Berkeley packet filter (BPF). BPF allows a user-space program to create taps into operating system data streams throughout the operating system stacks. For example, the Linux operating system includes Linux socket filtering (LSF), which is derived from BPF. Internally, the Linux kernel may execute programs using a different instruction with similar underlying principles to BPF, known as extended BPF (eBPF) or internal BPF. Typical computing devices execute eBPF programs in software using the processor of the computing device. In those systems, the filter program may be expressed in a programming language such as a restricted subset of the "C" language. A virtual machine within the kernel executes the filter to determine whether to drop packets, allow packets, or perform other actions.

In typical technologies, static mechanisms may be used to program new filter capabilities within a network interface controller (NIC). However, such static mechanisms are typically embodied as global updates to the associated compute device and may require operating system changes. For example, certain Linux operating system tools, such as the "tc" command and the "devlink" command may be used to achieve hardware programming. Static mechanisms of updating of filter and/or other capabilities of hardware of NICs may require rebooting or taking the associated network device offline to update the operating system. Additionally, such static mechanisms typically do not allow for fine-grained tuning of capabilities (e.g., on the individual queue level).

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

FIG. 5 is a pseudocode diagram illustrating at least one potential embodiment of requested offload hints that may be compiled according to the method of FIG. 4;

DETAILED DESCRIPTION OF THE DRAWINGS

Figure 1:
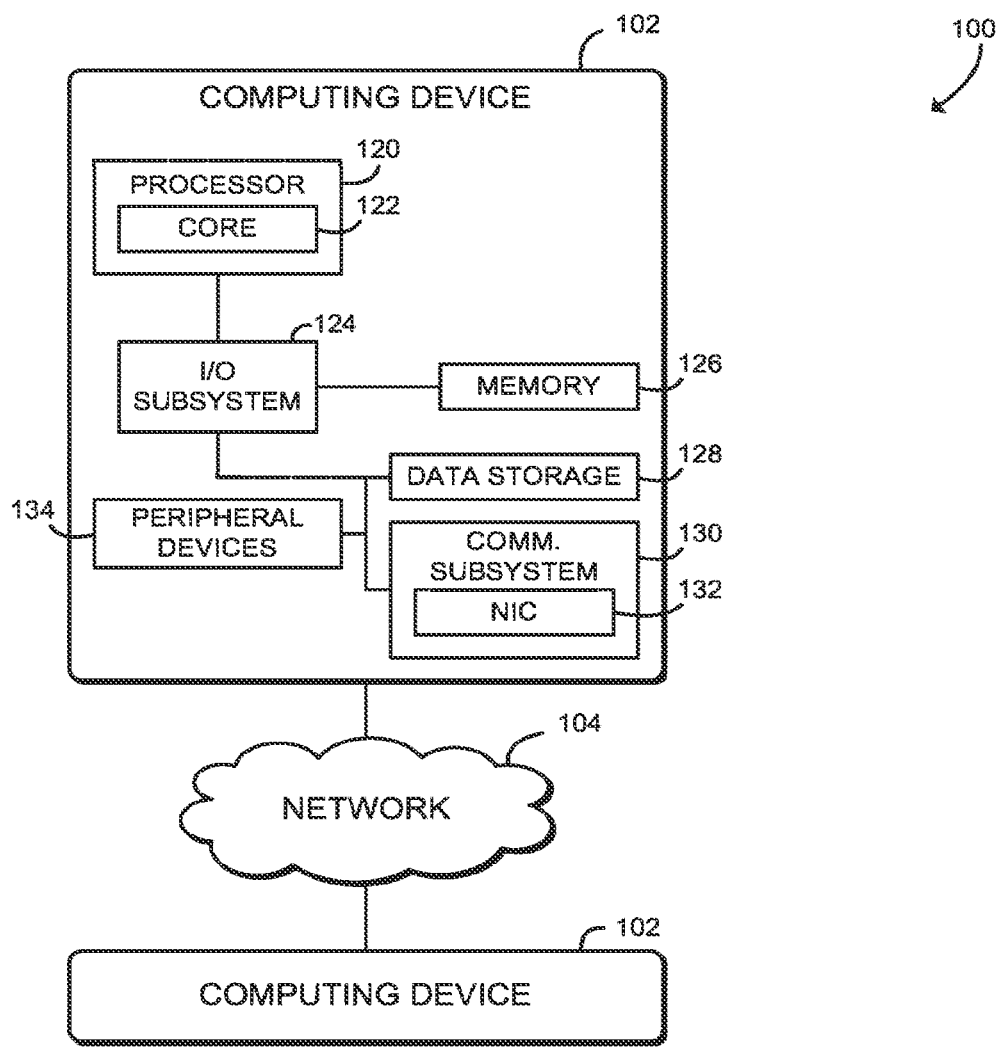
FIG. 1 is a simplified block diagram of at least one embodiment of a system for programming accelerated network packet processing.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures.

Additionally, the inclusion of a structural or method feature in a particular figure is not meant to imply that such feature is required in all embodiments and, in some embodiments, may not be included or may be combined with other features.

Referring now to FIG. 1, a system 100 for programming flexible accelerated network packet processing includes multiple computing devices 102 in communication over a network 104. Each computing device 102 includes a network interface controller (NIC) 132 that may perform accelerated offloads for certain network packet processing tasks. In use, as described further below, the computing device 102 may compile a packet processing program, such as an eBPF program, into a binary executable or loadable file. The binary file includes a section that defines one or more requested offload hints that were specified in the eBPF program source. An offload hint is a requested hardware offload of one or more operations that may be but is not required to be performed by a hardware accelerator such as the NIC 132. The computing device 102 loads the binary file, reads the section with the requested offload hints, and provides those requested offload hints to a NIC driver. The NIC driver translates those requested hints into a hardware configuration specific to the NIC 132 and programs the NIC 132 accordingly. The NIC 132 performs accelerated processing (i.e., performs one or more hardware offloads) on incoming network packets, and returns the results of that processing as metadata. The eBPF program executed by the computing device 102 uses the metadata to perform packet processing actions. Accordingly, by moving the offloaded operations to the NIC 132, the system 100 may provide improved packet processing performance compared to typical eBPF systems that perform processing in software. Thus, a user may specify flexible business logic in an eBPF program that can be coupled with high-performance accelerated network processing. This combination of flexibility and performance may be highly useful for cloud computing, communications infrastructure, network appliances, and other datacenter usages. Additionally, this combination of flexibility and performance may not be available in typical datacenters.

Each computing device 102 may be embodied as any type of computation or computer device capable of performing the functions described herein, including, without limitation, a computer, a server, a rack-based server, a blade server, a workstation, a desktop computer, a laptop computer, a notebook computer, a tablet computer, a mobile computing device, a wearable computing device, a network appliance, a web appliance, a distributed computing system, a processor-based system, and/or a consumer electronic device. Additionally or alternatively, the computing device 102 may be embodied as a one or more compute sleds, memory sleds, or other racks, sleds, computing chassis, or other components of a physically disaggregated computing device. As shown in FIG. 1, the computing device 102 illustratively include a processor 120, an input/output subsystem 124, a memory 126, a data storage device 128, a communication subsystem 130, and/or other components and devices commonly found in a server or similar computing device. Of course, the computing device 102 may include other or additional components, such as those commonly found in a server computer (e.g., various input/output devices), in other embodiments. Additionally, in some embodiments, one or more of the illustrative components may be incorporated in, or otherwise form a portion of, another component. For example, the memory 126, or portions thereof, may be incorporated in the processor 120 in some embodiments.

The processor 120 may be embodied as any type of processor capable of performing the functions described herein. The processor 120 is illustratively a multi-core processor, however, in other embodiments the processor 120 may be embodied as a single or multi-core processor(s), digital signal processor, microcontroller, or other processor or processing/controlling circuit. The illustrative processor 120 includes multiple processor cores 122, each of which is an independent, general-purpose processing unit capable of executing programmed instructions. For example, each processor core 122 may execute instructions from a general-purpose instruction set architecture (ISA) such as IA-32 or Intel® 64. Although illustrated with one processor core 122, in some embodiments the processor 120 may include a larger number of processor cores 122, for example four processor cores 122, fourteen processor cores 122, twenty-eight processor cores 122, or a different number. Additionally, although illustrated as including a single processor 120, in some embodiments the computing device 102 may be embodied as a multi-socket server with multiple processors 120.

The memory 126 may be embodied as any type of volatile or non-volatile memory or data storage capable of performing the functions described herein. In operation, the memory 126 may store various data and software used during operation of the computing device 102 such operating systems, applications, programs, libraries, and drivers. The memory 126 is communicatively coupled to the processor 120 via the I/O subsystem 124, which may be embodied as circuitry and/or components to facilitate input/output operations with the processor 120, the memory 126, and other components of the computing device 102. For example, the I/O subsystem 124 may be embodied as, or otherwise include, memory controller hubs, input/output control hubs, sensor hubs, firmware devices, communication links (e.g., point-to-point links, bus links, wires, cables, light guides, printed circuit board traces, etc.) and/or other components and subsystems to facilitate the input/output operations. In some embodiments, the I/O subsystem 124 may form a portion of a system-on-a-chip (SoC) and be incorporated, along with the processor 120, the memory 126, and other components of the computing device 102, on a single integrated circuit chip.

The data storage device 128 may be embodied as any type of device or devices configured for short-term or long-term storage of data such as, for example, memory devices and circuits, memory cards, hard disk drives, solid-state drives, non-volatile flash memory, or other data storage devices. The computing device 102 also includes the communication subsystem 130, which may be embodied as any communication circuit, device, or collection thereof, capable of enabling communications between the computing device 102 and other remote devices over the computer network 104. For example, the communication subsystem 130 may be embodied as or otherwise include a network interface controller (NIC) 132 or other network controller for sending and/or receiving network data with remote devices. The NIC 132 may be embodied as any network interface card, network adapter, host fabric interface, network coprocessor, or other component that connects the computing device 102 to the network 104. The communication subsystem 130 may be configured to use any one or more communication technology (e.g., wired or wireless communications) and associated protocols (e.g., Ethernet, InfiniBand®, Bluetooth®, Wi-Fi®, WiMAX, 3G, 4G LTE, etc.) to effect such communication. In some embodiments, the communication subsystem 130 and/or the NIC 132 may form a portion of an SoC and be incorporated along with the processor 120 and other components of the computing device 102 on a single integrated circuit chip.

As described further below, the NIC 132 may perform one or more accelerated network packet processing operations. For example, the NIC 132 may perform accelerated packet classification, packet modification, quality-of-service (QoS) operations, hashing and load balancing, checksum operations, and other packet processing operations. The NIC 132 may include or be coupled with one or more accelerator devices, which may be embodied as a field-programmable gate array (FPGA), an application-specific integrated circuit (ASIC), an embedded digital logic block, a coprocessor, or other digital logic device capable of performing accelerated network packet processing operations. For example, in some embodiments an FPGA may be included in a multi-chip package with the processor 120 and the NIC 132, and the FPGA may be coupled to the processor 120 and/or the NIC 132 via multiple high-speed connection interfaces including coherent and/or non-coherent interconnects.

The computing device 102 may further include one or more peripheral devices 134. The peripheral devices 134 may include any number of additional input/output devices, interface devices, and/or other peripheral devices. For example, in some embodiments, the peripheral devices 134 may include a touch screen, graphics circuitry, a graphical processing unit (GPU) and/or processor graphics, an audio device, a microphone, a camera, a keyboard, a mouse, a network interface, and/or other input/output devices, interface devices, and/or peripheral devices.

The computing devices 102 may be configured to transmit and receive data with each other and/or other devices of the system 100 over the network 104. The network 104 may be embodied as any number of various wired and/or wireless networks. For example, the network 104 may be embodied as, or otherwise include, a wired or wireless local area network (LAN), and/or a wired or wireless wide area network (WAN). As such, the network 104 may include any number of additional devices, such as additional computers, routers, and switches, to facilitate communications among the devices of the system 100. In the illustrative embodiment, the network 104 is embodied as a local Ethernet network.

Figure 2:
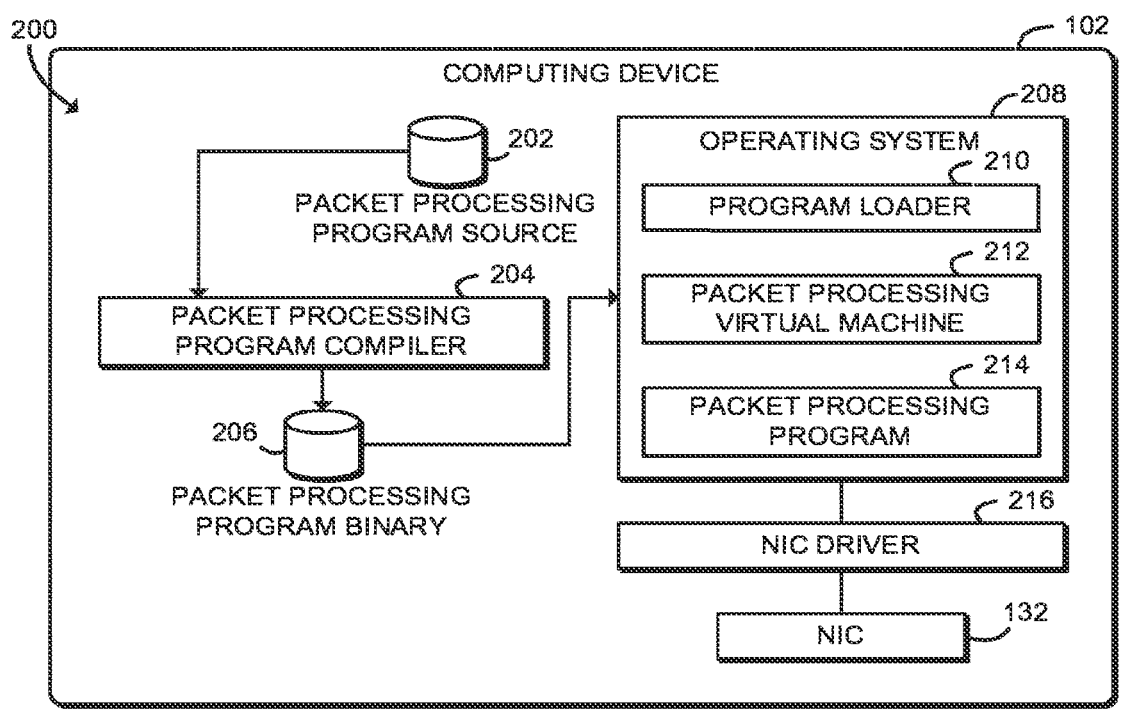
FIG. 2 is a simplified block diagram of at least one embodiment of an environment of a computing device of FIG. 1.

Referring now to FIG. 2, in an illustrative embodiment, the computing device 102 establishes an environment 200 during operation. The illustrative environment 200 includes a packet processing program compiler 204, an operating system 208, a NIC driver 216, and the NIC 132. The operating system 208 further includes a program loader 210, a packet processing virtual machine 212, and a packet processing program 214. As shown, the various components of the environment 200 may be embodied as hardware, microcode, firmware, software, or a combination thereof. As such, in some embodiments, one or more of the components of the environment 200 may be embodied as circuitry or collection of electrical devices (e.g., packet processing program compiler circuitry 204, program loader circuitry 210, packet processing virtual machine circuitry 212, packet processing program circuitry 214, and/or NIC driver circuitry 216). It should be appreciated that, in such embodiments, one or more of the packet processing program compiler circuitry 204, the program loader circuitry 210, the packet processing virtual machine circuitry 212, the packet processing program circuitry 214, and/or the NIC driver circuitry 216 may form a portion of the processor 120, the NIC 132, the I/O subsystem 124, and/or other components of the computing device 102. In the illustrative embodiment, the packet processing program compiler 204, the operating system 208, and the NIC driver 216 are executed by one or more processor cores 122 of the processor 120. Additionally, in some embodiments, one or more of the illustrative components may form a portion of another component and/or one or more of the illustrative components may be independent of one another.

The packet processing program compiler 204 is configured to compile packet processing program source code 202, which is illustratively an extended Berkeley packet filter (eBPF) program source code 202. The packet processing program source code 202 is indicative of one or more requested offload hints, which may include packet parsing hints, packet classification hints, packet modification hints, QoS hints, hashing hints, checksum hints, or other hints relating to accelerated processing to be performed by the NIC 132. The packet processing program compiler 204 is configured to generate a packet processing program binary file 206, which is illustratively an eBPF binary file 206, in response to compiling the source code 202. The binary file 206 may be embodied as an executable and linkable format (ELF) binary that includes an extended Berkeley packet filter (eBPF) program. The ELF binary includes a section that includes the requested offload hints. Additionally or alternatively, although the environment 200 is illustrated as including the packet processing program compiler 204, it should be understood that in some embodiments compilation may be performed by a different device and the compiled binary file 206 may be provisioned, downloaded, or otherwise provided to the computing device 102.

The operating system 208 may be embodied as any operating system, hypervisor, virtual machine monitor, or other supervisory component of the computing device 102. Illustratively, the operating system 208 may be embodied as a Linux®-based operating system, including a Linux kernel and associated networking components. The program loader 210 is configured to load the binary file 206. As described above, the binary file 206 includes a requested hint section that includes the one or more requested offload hints specified in the source code 202. The program loader 210 may be further configured to provide the requested offload hints to the NIC driver 216 via a predetermined application programming interface (API). The packet processing virtual machine 212 is configured to execute the packet processing program 214 in response to loading the binary file 206. The packet processing virtual machine 212 is illustratively an eBPF virtual machine 212. The packet processing program 214 is included in the binary file 206 and is illustratively an eBPF program 214.

The NIC driver 216 is configured to determine a hardware configuration for the NIC 132 as a function of the requested offload hints and to program the NIC 132 with that hardware configuration. In some embodiments, as described further below, the NIC driver 216 may copy or otherwise provide metadata generated by the NIC 132 to the packet processing program 214. Additionally, although illustrated as being performed by the NIC driver 216, it should be understood that in other embodiments those functions may be performed by a different component, such as the operating system 208, hypervisor, virtual machine monitor, or any other component capable of performing those functions.

The NIC 132 is configured to process a network packet in response to being programmed with the hardware configuration associated with the requested offload hints. The NIC 132 is further configured to return metadata based on the requested offload hints and generated in response to processing the network packet to the processor 120 (e.g., to the NIC driver 216, the operating system 208, and/or other components of the computing device 102). For example, the metadata may be included in one or more receive (Rx) descriptors or in a DMA packet buffer. As an example, processing the network packet may include generating a hash value as a function of one or more fields of the network packet that were specified by a hashing hint, and the metadata may include the generated hash value. As another example, processing the network packet may include identifying a packet header offset of a packet header within the network packet, where the packet header is identified by a parsing hint from the NIC 132. In that example, the metadata may include the packet header offset. As yet another example, processing the network packet may include matching the network packet against a flow rule specified by a packet classification hint. In that example, the metadata may include a predetermined match rule identifier (e.g., a constant value) included in the packet classification hint.

The packet processing program 214 is configured to perform a packet processing action based on the metadata returned from the NIC 132. The packet processing action may include dropping a packet, forwarding a packet to a device or interface, modifying a packet (e.g., encapsulating, de-encapsulating the packet), or performing another packet processing action. For example, in an embodiment in which the metadata includes a match rule identifier provided by the NIC 132, performing the packet processing action may include selecting the packet processing action as a function of the match rule identifier. In that example, performance may be improved by offloading expensive flow rule matching to the NIC 132.

Figure 3:
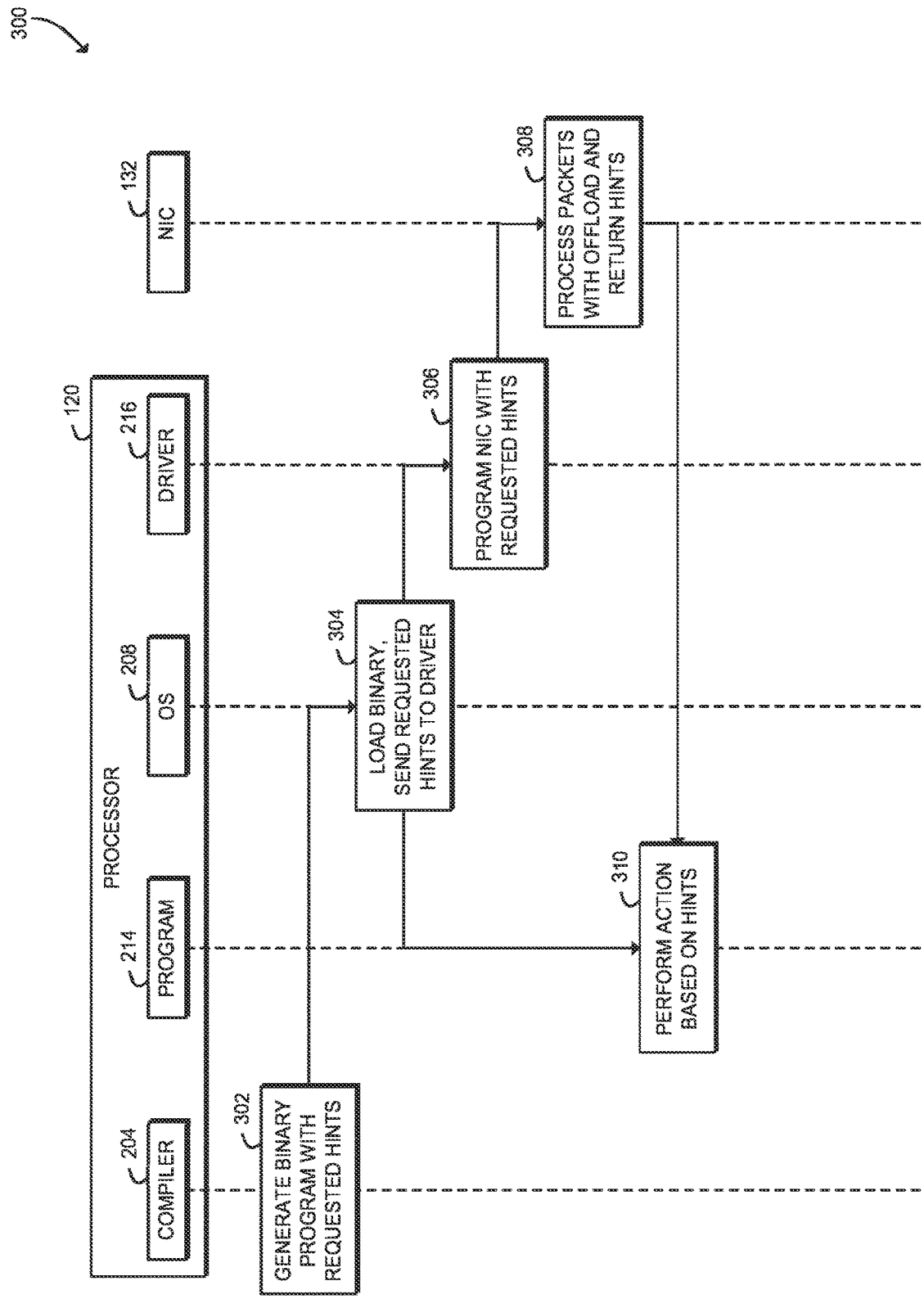
FIG. 3 is a simplified interaction diagram of at least one embodiment of a method for programming accelerated network packet processing that may be executed by a computing device of FIGS. 1-2.

Referring now to FIG. 3, in use, the computing device 102 may execute a method 300 for programming accelerated network packet processing. It should be appreciated that, in some embodiments, the operations of the method 300 may be performed by one or more components of the environment 200 of the computing device 102 as shown in FIG. 2. The method 300 begins in block 302, in which the eBPF program compiler 204 compiles an eBPF program source code 202 into an eBPF binary file 206 that includes one or more requested offload hints. Each offload hint identifies accelerated packet processing to be performed by the NIC 132 and may specify how the results of that processing are to be returned as metadata. One potential embodiment of a method for generating the eBPF binary file 206 is described further below in connection with FIG. 4.

In block 304, the operating system 208 (e.g., the eBPF program loader 210) loads the eBPF binary file 206 and sends the one or more requested hints to the NIC driver 216. The operating system 208 may read a specified section of the eBPF binary file 206 that includes the requested offload hints, and may send the requested hints to the NIC driver 216 via an application programming interface (API). The operating system 208 also loads the eBPF program 214 from the eBPF program binary file 206. The operating system 208 may verify and perform safety checks on the eBPF program 214 as it is loaded. One potential embodiment of a method for loading and executing the eBPF program 214 is described further below in connection with FIG. 6. Additionally or alternatively, although described as both generating the eBPF program binary file 206 in block 302 and loading the eBPF program binary file 206 in block 304, it should be understood that in some embodiments those functions may be performed by different computing devices 102. For example, in some embodiments, the eBPF program binary file 206 may be generated by one computing device 102 and then the resulting eBPF program binary file 206 may be provisioned to multiple computing devices 102, for example in a data center.

In block 306, the NIC driver 216 programs the NIC 132 with the requested offload hints. The NIC driver 216 may translate the requested hints into a hardware configuration specific to the NIC 132. Thus, in some embodiments, the computing device 102 may be configured with a particular NIC driver 216 that is appropriate for the NIC 132 in use. Additionally or alternatively, in some embodiments the NIC driver 216 may be used with multiple types of NICs 132. For example, the NIC driver 216 may identify the NIC 132 in use and translate the requested hints into a hardware configuration based on the identity of the NIC 132. One potential embodiment of a method for programming the NIC 132 is described below in connection with FIG. 7.

In block 308, the NIC 132 processes packets with one or more accelerated hardware offloads and then returns metadata for the requested hints to the processor 120. The metadata may include computed data or other results generated by the NIC 132 while performing the hardware offloads. The metadata may be returned directly to the eBPF program 214 as shown or, in some embodiments, may be returned via the NIC driver 216 and/or operating system 208. One potential embodiment of a method for performing the accelerated hardware offloads is described below in connection with FIG. 8.

In block 310, the eBPF program 214 performs a packet processing action based on the hints received from the NIC 132. Actions performed by the eBPF program 214 may include forwarding or dropping packets, modifying packets, rate limiting or other QoS actions, load balancing, or other network packet processing actions. For example, the eBPF program 214, executed in connection with the eBPF virtual machine 212 of the operating system 208, may use metadata provided by the NIC 132 as a parameter of an action, select an action as a function of metadata provided by the NIC 132, or otherwise perform a packet processing action based on metadata returned by the NIC 132. As described above, one potential embodiment of a method for executing an eBPF program 214 is described further below in connection with FIG. 6.

Figure 4:
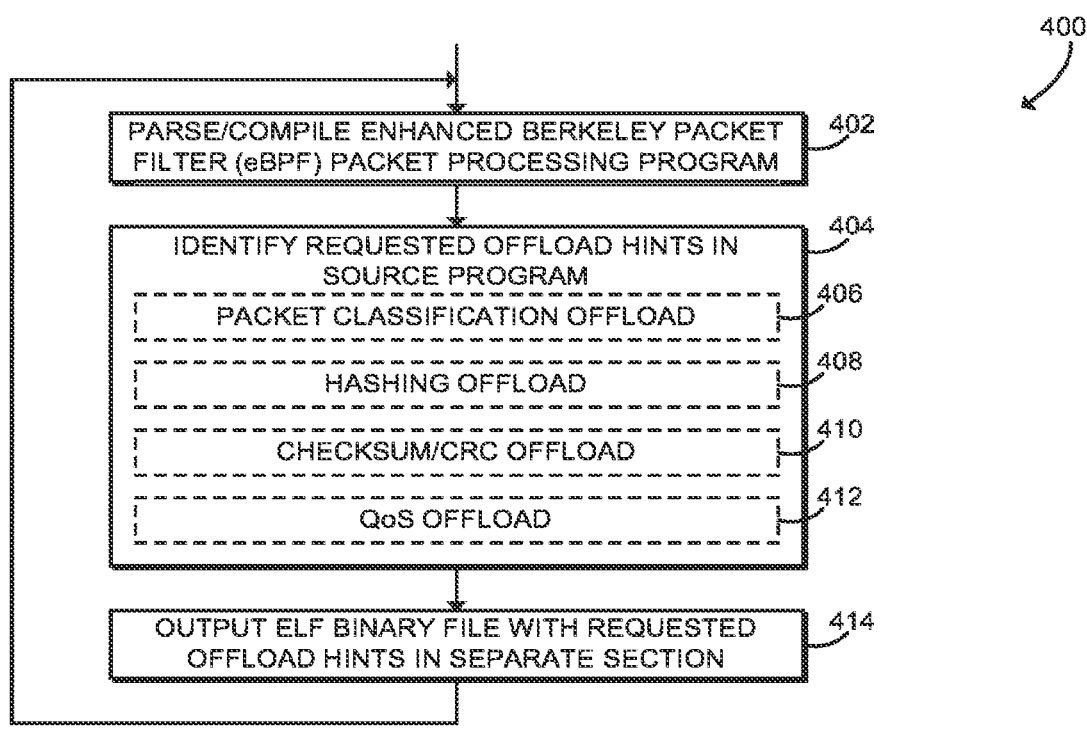
FIG. 4 is a simplified flow diagram of at least one embodiment of a method for compiling a packet processing program that may be executed by a computing device of FIGS. 1-2.

Referring now to FIG. 4, in use, the computing device 102 may execute a method 400 for compiling a packet processing program. It should be appreciated that, in some embodiments, the operations of the method 400 may be performed by one or more components of the environment 200 of the computing device 102 as shown in FIG. 2. The method 400 begins in block 402, in which the computing device 102 parses and/or compiles an extended Berkeley packet filter (eBPF) packet processing program. The packet processing program may be embodied as one or more source code files 202 that are written in a high-level programming language. For example, the source code 202 may be embodied as an eBPF program written in a restricted subset of the C programming language. Of course, in other embodiments the source code 202 may be embodied as an eBPF program written in another supported language, such as Python. In some embodiments, parsing, compilation, and other operations may be performed by one or more components included in and/or derived from an existing compiler toolchain. Illustratively, the source code 202 is compiled using the Clang C-language frontend for the LLVM project compiler toolchain.

In block 404, the computing device 102 identifies one or more requested offload hints included in the packet processing source program. The offload hints may be identified using any appropriate high-level language techniques. For example, in the illustrative embodiments the offload hints may be identified as C structures of a particular type that are requested to be located in a particular section of the output binary file. The offload hints may identify requested hardware acceleration operations to be performed by the NIC 132, parameters of those accelerated operations, parameters of metadata to be returned, and other parameters of the requested hardware acceleration offloads.

In some embodiments, in block 406 the requested offload hints may include one or more packet classification offloads. For example, classification offloads may include packet type identification (e.g., identifying a particular ordered chain of packet headers), determination of header offset for packet headers, extraction of field values from packet headers, or matching incoming packets on certain fields and their values. For packet matching, the returned hint may include a software-defined identifier associated with each matching rule. In some embodiments, in block 408 the requested offload hints may include one or more hashing offloads. For example, hashing offloads may include calculating a hash value over certain fields of the network packet and a given key. The requested offload hints may specify the input fields, the hash function, the key, or other parameters of the hashing offload. In some embodiments, in block 410, the requested offload hints may include one or more checksum/CRC offloads. For example, checksum offloads may include calculating a whole-packet checksum or CRC value. As another example, checksum offloads may include validating incoming checksums. In some embodiments, in block 412 the requested offload hints may include one or more QoS offloads. For example, the QoS offloads may include generating Coloring, Reporting Color, and other QoS data.

In block 414, the computing device 102 outputs an executable and linkable format (ELF) binary file 206 that includes the requested offload hints. The offload hints may be included in a separate section of the ELF binary file 206. The ELF binary file 206 also includes the eBPF program generated by compiling the source code 202. Although illustrated as an ELF binary, it should be understood that in other embodiments the packet processing program binary file 206 may be embodied as any binary file format that may be loaded and executed by the operating system 208 of the computing device 102. After outputting the binary file 206, the method 400 loops back to block 402 to continue compiling eBPF programs source code 202.

Referring now to FIG. 5, pseudocode diagram 500 illustrates at least one potential embodiment of requested offload hints that may be included in the eBPF program source code 202. As described above, the illustrative eBPF program source code 202 is written in a restricted subset of the C language. Each requested hint is a structure of type bpf_hw_hints_def and is marked to be in the ELF section "hw hints." The structure rx_hash defines a requested offload hint for calculating a hash in hardware. As shown, the requested hint defines the network packet header fields and mask to use when generating the hash value. The hash value may be used by the eBPF program, for example, for receive-side-scaling or other load balancing functions. The structure rx_offset defines a requested offload for identifying the offset of a network header in the packet. As shown, the requested hint identifies the type as PACKET_OFFSET_INNER_L4, which may request identification of the offset of one or more layer four packet headers in the network packet. The structure rx_match defines a requested offload for matching a packet against a flow rule. As shown, the requested hint identifies the header fields, mask, and value to compare against incoming packets to find matches. The requested hint also identifies a predetermined result (i.e., the constant 25), which is returned by the NIC 132 in response to a match and may be used by the eBPF program to make packet processing decisions.

Figure 6:
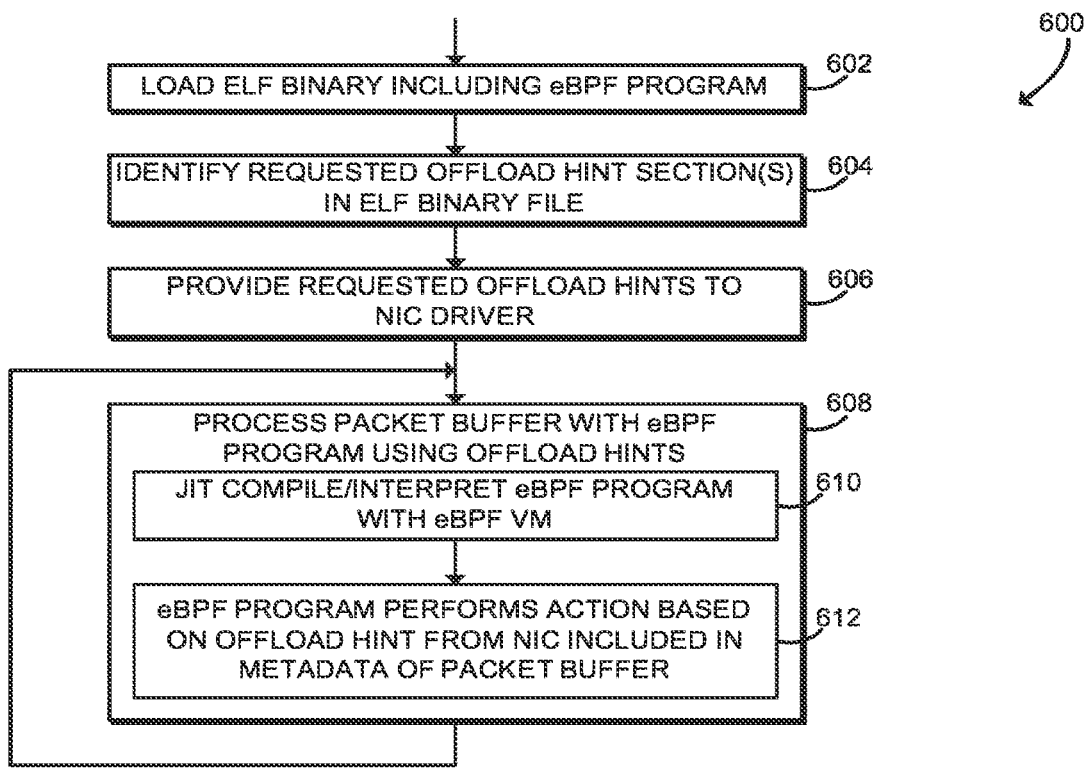
FIG. 6 is a simplified flow diagram of at least one embodiment of a method for loading and executing a binary packet processing program that may be executed by a computing device of FIGS. 1-2.

Referring now to FIG. 6, in use, the computing device 102 may execute a method 600 for loading and executing a binary packet processing program. It should be appreciated that, in some embodiments, the operations of the method 600 may be performed by one or more components of the environment 200 of the computing device 102 as shown in FIG. 2. The method 600 begins in block 602, in which the computing device 102 loads an ELF binary file 206 that includes an eBPF program 214. The ELF binary file 206 may be generated by the packet processing program compiler 204 as described above in connection with FIG. 4. The binary file 206 may be loaded, for example, by a kernel-mode component of the operating system 208. In some embodiments, the operating system 208 may validate the eBPF program 214 or otherwise perform safety checks on the eBPF program 214 as it is loaded. For example, the operating system 208 may perform static binary analysis of the binary file 206 and/or the eBPF program 214 to ensure that the eBPF program 214 conforms to a restricted subset of the C language. Continuing that example, the operating system 208 may ensure that all array accesses in the eBPF program 214 include bounds checks or other safety checks. Validating and/or safety-checking the eBPF program 214 may improve reliability and/or reduce exposure to security vulnerabilities.

In block 604, the computing device 102 identifies one or more sections of the ELF binary file 206 that includes requested hardware offload hints. The requested offload hint section(s) may be identified using a predetermined name or other identification. As described above in connection with FIGS. 4-5, the requested offload section may be included by the packet processing program compiler 204 and indicates specific hardware offloads that were requested in the eBPF program source 202 by the developer of the packet processing program 214.

In block 606, the computing device 102 provides the requested offload hints from the binary file 206 to the NIC driver 216. The requested offload hints may be provided using any appropriate application program interface (API), kernel interface, or other technique for passing information from the operating system 208 (e.g., an operating system kernel) to the NIC driver 216. For example, the computing device 102 may pass one more C structures loaded from the requested offload hints section of the program binary file 206 to the NIC driver 216. As described further below, the NIC driver 216 programs the NIC 132 to perform the requested hardware offloads.

In block 608, the computing device 102 processes a network packet buffer with the eBPF program 214 using one or more offload hints provided by the NIC 132. In block 610, the computing device 102 may just-in-time (JIT) compile, interpret, or otherwise execute the eBPF program 214 with the packet processing virtual machine 212, which is illustratively an eBPF virtual machine 212. In block 612, the computing device 102, executing the eBPF program 214, may perform an action based on an offload hint generated by the NIC 132 and included in metadata of the packet buffer. As described further below, the metadata may be provided in the packet buffer directly by the NIC 132, for example in a direct memory access operation, or may be provided by the NIC driver 216 or other intermediate component. The metadata may include a calculated value, a match result, or other results of hardware accelerated offloads performed by the NIC 132. The eBPF program 214 may make a packet processing action determination (e.g., drop, forward, modify, etc.) based on the contents of the metadata.

For example, the eBPF program 214 may drop, allow, forward, modify, or otherwise perform a packet processing operation based on packet classification or packet matching performed by the NIC 132. Continuing that example, the eBPF program 214 may forward a packet to a different network interface or queue based on a packet type, one or more extracted header fields, a software-defined identifier of a matching rule, or other metadata generated by the NIC 132. The eBPF program 214 may use parsing hints such as header offsets included in the metadata to parse the network packet. As another example, the eBPF program 214 may modify the network packet (e.g., modifying the packet's contents or encapsulating/de-encapsulating the packet to change the packet type) based on a modified packet type returned in the metadata. As another example, the eBPF program 214 may perform one or more QoS actions such as rate limiting or traffic policing based on QoS data returned in the metadata, such as Coloring or Reporting Color data. As another example, the eBPF program 214 may use a hash value returned in the metadata for load balancing or other operations. As another example, the eBPF program 214 may use checksum data, CRC data, validation flags, or other checksum data computed by the NIC 132 and returned as metadata.

After performing the packet processing action, the method 600 loops back to block 608 to continue processing packet buffers. In some embodiments, the method 600 may restart at block 602 to reload the ELF binary file 206 and reconfigure the NIC 132. In some embodiments, the NIC 132 may be reconfigured at runtime without rebooting the computing device 102 or otherwise interrupting packet processing.

Figure 7:
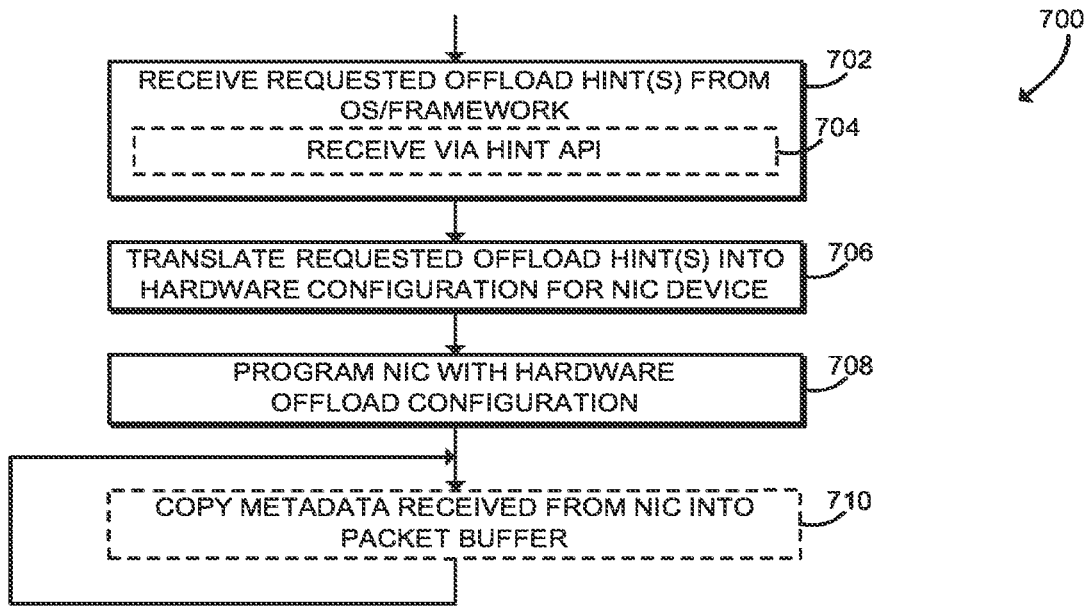
FIG. 7 is a simplified flow diagram of at least one embodiment of a method for configuring a network interface controller for accelerated offload that may be executed by a computing device of FIGS. 1-2.

Referring now to FIG. 7, in use, the computing device 102 may execute a method 700 for configuring a NIC 132. It should be appreciated that, in some embodiments, the operations of the method 700 may be performed by one or more components of the environment 200 of the computing device 102 as shown in FIG. 2. The method 700 begins in block 702, in which the computing device 102 receives one or more requested offload hints from the operating system 208 or other packet processing framework of the computing device 102. As described above, the requested offload hints may identify specific accelerated hardware offloads that the eBPF program 214 has requested be performed by the NIC 132. In some embodiments, in block 704, a NIC driver 216 of the computing device 102 may receive the requested offload hints from the operating system 208 via an associated hint API. For example, as described above, the NIC driver 216 may receive one more C structures loaded from the requested offload hints section of the program binary file 206.

In block 706, the computing device 102 translates the requested offload hints into hardware configuration appropriate for the NIC 132. The hardware configuration may be embodied as hardware instructions, register settings, or any other hardware configuration that instructs the NIC 132 to perform the requested hardware offloads. Because the NIC driver 216 generates the hardware configuration for the NIC 132, the eBPF program 214 may not need to be aware of the particular NIC 132 in use by the computing device 102. Additionally or alternatively, in some embodiments the NIC driver 216 may determine whether the NIC 132 is capable of performing all of the requested hardware offloads. If not, the NIC driver 216 may indicate an error to the operating system 208 or, in some embodiments, the NIC driver 216 may configure a fallback software routine to perform the requested offload, for example, in another eBPF program 214. Of course, a software fallback may not provide the same performance as provided by the NIC 132.

In block 708, the computing device 102 programs the NIC 132 with the hardware offload configuration. For example, the processor 120 may send instructions, register settings, descriptors, or otherwise configure the NIC 132 to perform the requested hardware offloads. After configuration, the NIC 132 performs the requested accelerated hardware offloads as described further below in connection with FIG. 8.

In some embodiments, in block 710 the NIC driver 216 of the computing device 102 may copy metadata received from the NIC 132 into a packet buffer that may be processed by the eBPF program 214. For example, in some embodiments, the NIC 132 may return metadata in an Rx descriptor. The Rx descriptor may be embodied as an in-memory object used to pass data relating to packet reception from the NIC 132 to the operating system 208 and/or the NIC driver 216. The Rx descriptor may be stored in a descriptor queue located in kernel memory space and thus may be inaccessible to the eBPF program 214. In those embodiments, the NIC driver 216 may prepend the metadata to received network packet data inside of a packet buffer that is processed by the eBPF program 214. After copying the metadata, the method 700 may loop back to block 710 to continue copying metadata for subsequent packets.

In some embodiments, the method 700 may restart at block 702 to reconfigure the NIC 132 with new or modified requested offload hints. As described above, in some embodiments the NIC 132 may be reconfigured at runtime without rebooting the computing device 102 or otherwise interrupting packet processing.

Figure 8:
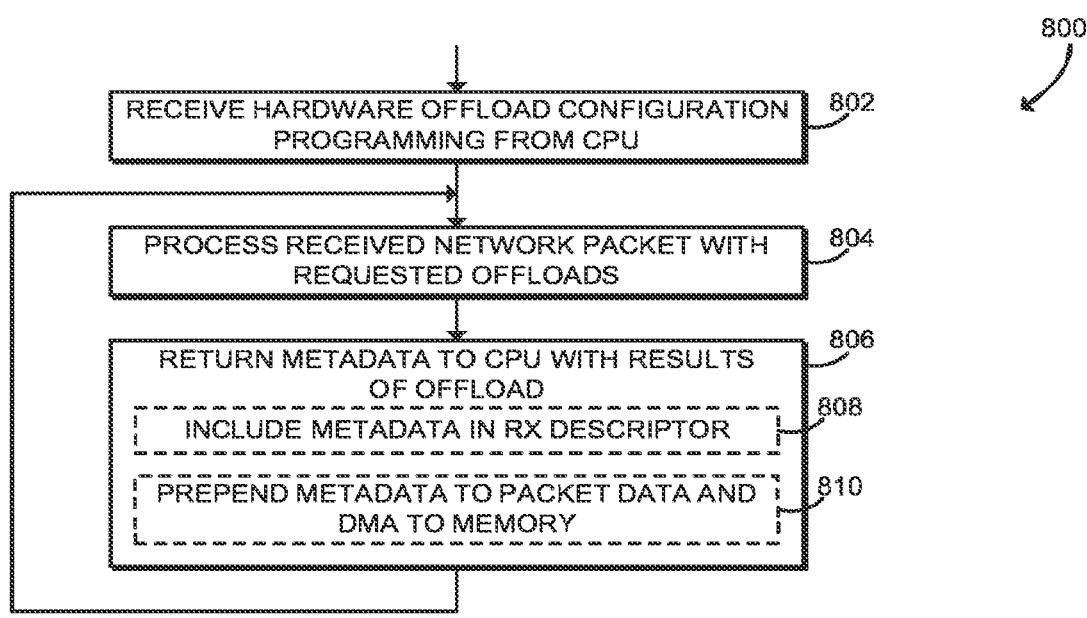
FIG. 8 is a simplified flow diagram of at least one embodiment of a method for performing accelerated packet processing offload that may be executed by a computing device of FIGS. 1-2.

Referring now to FIG. 8, in use, the computing device 102 may execute a method 800 for performing accelerated packet processing offload. It should be appreciated that, in some embodiments, the operations of the method 800 may be performed by one or more components of the environment 200 of the computing device 102 as shown in FIG. 2. The method 800 begins in block 802, in which the NIC 132 of the computing device 102 receives hardware offload configuration programming from the processor 120. As described above, the processor 120 may send instructions, register settings, descriptors, or otherwise configure the NIC 132 to perform one or more hardware offloads.

In block 804, after receiving the hardware configuration programming, the NIC 132 processes one or more received network packets with the requested hardware offloads. For example, the NIC 132 may perform one or more classification operations on the network packet, such as identifying the packet type, parsing and extracting packet headers, matching against a flow rule or other match rule, or other classification operations. As another example, the NIC 132 may perform one or more QoS operations such as rate limiting, policing, traffic shaping, or other QoS operations. As another example, the NIC 132 may perform one or more hashing operations, including determining the type of hash to perform, the fields used as input to the hash, and calculating the hash value. As another example, the NIC 132 may perform one or more checksum or CRC operations, such as calculating whole packet checksums or CRCs, determining whether an incoming checksum is valid, or other checksum operations.

In block 806, the NIC 132 returns metadata to the processor 120 that includes results or other offload hints generated by the requested hardware offloads. As described above, the metadata may include a calculated value, a match result, or other results of hardware accelerated offloads performed by the NIC 132. For example, the metadata may indicate the results of classification operations, including packet type, header offset, extracted header fields, software-defined identifiers associated with particular match rules, or other results. As another example, the metadata may indicate results of QoS operations, such as Coloring, Reporting Color, or other QoS data generated by the NIC 132. As another example, the metadata may include hash values generated by the NIC 132 or other results of hash operations. As another example, the metadata may include checksums calculated by the NIC 132, flags indicating whether an incoming checksum is valid, or other results of checksum operations performed by the NIC 132.

The NIC 132 may use any appropriate technique to return the metadata to the processor 120. In some embodiments, in block 808 the NIC 132 may include the metadata in one or more Rx descriptors. As described above, the Rx descriptor may be embodied as an in-memory object used to pass data relating to packet reception from the NIC 132 to the operating system 208 and/or the NIC driver 216 executed by the processor 120. The NIC 132 may perform one or more direct memory access (DMA) or other operations to store the Rx descriptor, including the metadata, in a descriptor queue located in kernel memory space. In some embodiments, in block 810 the NIC 132 may prepend the metadata to the network packet data and store the combined metadata and packet data in a memory buffer using one or more DMA operations. In those embodiments, the metadata may be stored in a packet buffer that may be processed directly by the eBPF program 214 without an additional memory copy. After returning the metadata, the method 800 loops back to block 804, in which the NIC 132 continues to process network packets. In some embodiments, the method 800 may restart at block 802 to receive hardware offload configuration programming with new or modified requested offload hints. As described above, in some embodiments the NIC 132 may be reconfigured at runtime without rebooting the computing device 102 or otherwise interrupting packet processing.

It should be appreciated that, in some embodiments, the methods 300, 400, 600, 700, and/or 800 may be embodied as various instructions stored on a computer-readable media, which may be executed by the processor 120, the NIC 132, and/or other components of the computing device 102 to cause the computing device 102 to perform the respective method 300, 400, 600, 700, and/or 800. The computer-readable media may be embodied as any type of media capable of being read by the computing device 102 including, but not limited to, the memory 126, the data storage device 128, firmware devices, microcode, other memory or data storage devices of the computing device 102, portable media readable by a peripheral device 134 of the computing device 102, and/or other media.

EXAMPLES

Illustrative examples of the technologies disclosed herein are provided below. An embodiment of the technologies may include any one or more, and any combination of, the examples described below.

Example 1 includes a computing device for accelerated packet processing, the computing device comprising: a network controller; a processor; a program loader to load a packet processing program binary file, wherein the packet processing program binary file comprises a requested hint section that includes one or more requested offload hints; and a NIC driver to (i) determine a hardware configuration for the network controller as a function of the requested offload hints and (ii) program, by the processor, the network controller with the hardware configuration in response to a determination of the hardware configuration; wherein the network controller is to (i) process a network packet in response to programming of the network controller, and (ii) return metadata to the processor based on the one or more requested offload hints, wherein the metadata is generated in response to processing of the network packet.

Example 2 includes the subject matter of Example 1, and further comprising: a compiler to (i) compile a packet processing program source code file, wherein the packet processing program source code file is indicative of the one or more requested offload hints, and (ii) generate the packet processing program binary file in response to compilation of the packet processing program source code file; wherein to load the packet processing program binary file comprises to load the packet processing program binary file in response to generation of the packet processing program binary file.

Example 3 includes the subject matter of any of Examples 1 and 2, and wherein the one or more requested offload hints comprises a packet parsing hint, a packet classification hint, a packet modification hint, a quality of service hint, a hashing hint, or a checksum hint.

Example 4 includes the subject matter of any of Examples 1-3, and further comprising a packet processing program to perform a packet processing action based on the metadata in response to a return of the metadata.

Example 5 includes the subject matter of any of Examples 1-4, and wherein: the packet processing program binary file comprises an executable and linkable format (ELF) binary that includes an enhanced Berkeley packet filter (eBPF) program and the requested hint section; wherein the packet processing program comprises the eBPF program.

Example 6 includes the subject matter of any of Examples 1-5, and further comprising a packet processing virtual machine to execute the packet processing program in response to loading of the packet processing program binary file, wherein the packet processing program is included in the packet processing program binary file.

Example 7 includes the subject matter of any of Examples 1-6, and wherein: the one or more requested offload hints comprises a packet classification hint; to process the network packet comprises to match, by the network controller, the network packet against a flow rule, wherein the packet classification hint is indicative of the flow rule; to return the metadata comprises to return a match rule identifier, wherein the packet classification hint is indicative of the match rule identifier; and to perform the packet processing action comprises to select the packet processing action as a function of the match rule identifier.

Example 8 includes the subject matter of any of Examples 1-7, and wherein: the program loader is further to provide the requested offload hints to the NIC driver via a predetermined application programming interface (API); wherein to determine the hardware configuration comprises to determine the hardware configuration by the NIC driver in response to provision of the requested offload hints to the NIC driver.

Example 9 includes the subject matter of any of Examples 1-8, and wherein to return the metadata to the processor comprises to include the metadata in a receive descriptor.

Example 10 includes the subject matter of any of Examples 1-9, and wherein to return the metadata to the processor comprises to copy the metadata to a packet buffer via a direct memory access operation.

Example 11 includes the subject matter of any of Examples 1-10, and wherein: the one or more requested offload hints comprises a hashing hint; to process the network packet comprises to generate, by the network controller, a hash value as a function of one or more fields of the network packet, wherein the hashing hint is indicative of the one of more fields; and to return the metadata comprises to return the hash value.

Example 12 includes the subject matter of any of Examples 1-11, and wherein: the one or more requested offload hints comprises a packet parsing hint; to process the network packet comprises to identify, by the network controller, a packet header offset of a packet header in the network packet, wherein the packet parsing hint is indicative of the packet header; and to return the metadata comprises to return the packet header offset.

Example 13 includes a method for accelerated packet processing, the method comprising: loading, by a computing device, a packet processing program binary file, wherein the packet processing program binary file comprises a requested hint section that includes one or more requested offload hints; determining, by the computing device, a hardware configuration for a network controller of the computing device as a function of the requested offload hints; programming, by a processor of the computing device, the network controller with the hardware configuration in response to determining the hardware configuration; processing, by the network controller, a network packet in response to programming the network controller; and returning, by the network controller, metadata to the processor based on the one or more requested offload hints, wherein the metadata is generated in response to processing the network packet.

Example 14 includes the subject matter of Example 13, and further comprising: compiling, by the computing device, a packet processing program source code file, wherein the packet processing program source code file is indicative of the one or more requested offload hints; and generating, by the computing device, the packet processing program binary file in response to compiling the packet processing program source code file; wherein loading the packet processing program binary file comprises loading the packet processing program binary file in response to generating the packet processing program binary file.

Example 15 includes the subject matter of any of Examples 13 and 14, and wherein the one or more requested offload hints comprises a packet parsing hint, a packet classification hint, a packet modification hint, a quality of service hint, a hashing hint, or a checksum hint.

Example 16 includes the subject matter of any of Examples 13-15, and further performing, by the computing device, a packet processing action based on the metadata in response to returning the metadata.

Example 17 includes the subject matter of any of Examples 13-16, and wherein the packet processing program binary file comprises an executable and linkable format (ELF) binary that includes an enhanced Berkeley packet filter (eBPF) program and the requested hint section.

Example 18 includes the subject matter of any of Examples 13-17, and further comprising: executing, by the computing device, a packet processing program included in the packet processing program binary file in response to loading the packet processing program binary file; wherein performing the packet processing action comprises performing the packet processing action by the packet processing program.

Example 19 includes the subject matter of any of Examples 13-18, and wherein: the one or more requested offload hints comprises a packet classification hint; processing the network packet comprises matching, by the network controller, the network packet against a flow rule, wherein the packet classification hint is indicative of the flow rule; returning the metadata comprises returning a match rule identifier, wherein the packet classification hint is indicative of the match rule identifier; and performing the packet processing action comprises selecting the packet processing action as a function of the match rule identifier.

Example 20 includes the subject matter of any of Examples 13-19, and further comprising: providing, by the computing device, the requested offload hints to a driver of the computing device via a predetermined application programming interface (API); wherein determining the hardware configuration comprises determining the hardware configuration by the driver in response to providing the requested offload hints to the driver.

Example 21 includes the subject matter of any of Examples 13-20, and wherein returning the metadata to the processor comprises including the metadata in a receive descriptor.

Example 22 includes the subject matter of any of Examples 13-21, and wherein returning the metadata to the processor comprises copying the metadata to a packet buffer via a direct memory access operation.

Example 23 includes the subject matter of any of Examples 13-22, and wherein: the one or more requested offload hints comprises a hashing hint; processing the network packet comprises generating, by the network controller, a hash value as a function of one or more fields of the network packet, wherein the hashing hint is indicative of the one of more fields; and returning the metadata comprises returning the hash value.

Example 24 includes the subject matter of any of Examples 13-23, and wherein: the one or more requested offload hints comprises a packet parsing hint; processing the network packet comprises identifying, by the network controller, a packet header offset of a packet header in the network packet, wherein the packet parsing hint is indicative of the packet header; and returning the metadata comprises returning the packet header offset.

Example 25 includes one or more computer-readable storage media comprising a plurality of instructions stored thereon that, in response to being executed, cause a computing device to: load a packet processing program binary file, wherein the packet processing program binary file comprises a requested hint section that includes one or more requested offload hints; determine a hardware configuration for a network controller of the computing device as a function of the requested offload hints; program, by a processor of the computing device, the network controller with the hardware configuration in response to determining the hardware configuration; process, by the network controller, a network packet in response to programming the network controller; return, by the network controller, metadata to the processor based on the one or more requested offload hints, wherein the metadata is generated in response to processing the network packet; and perform a packet processing action based on the metadata in response to returning the metadata.

Example 26 includes the subject matter of Example 25, and further comprising a plurality of instructions stored thereon that, in response to being executed, cause the computing device to: compile a packet processing program source code file, wherein the packet processing program source code file is indicative of the one or more requested offload hints; and generate the packet processing program binary file in response to compiling the packet processing program source code file; wherein to load the packet processing program binary file comprises to load the packet processing program binary file in response to generating the packet processing program binary file.

Example 27 includes the subject matter of any of Examples 25 and 26, and wherein the one or more requested offload hints comprises a packet parsing hint, a packet classification hint, a packet modification hint, a quality of service hint, a hashing hint, or a checksum hint.

Example 28 includes the subject matter of any of Examples 25-27, and further comprising a plurality of instructions stored thereon that, in response to being executed, cause the computing device to perform a packet processing action based on the metadata in response to returning the metadata.

Example 29 includes the subject matter of any of Examples 25-28, and wherein the packet processing program binary file comprises an executable and linkable format (ELF) binary that includes an enhanced Berkeley packet filter (eBPF) program and the requested hint section.

Example 30 includes the subject matter of any of Examples 25-29, and further comprising a plurality of instructions stored thereon that, in response to being executed, cause the computing device to: execute a packet processing program included in the packet processing program binary file in response to loading the packet processing program binary file; wherein to perform the packet processing action comprises to perform the packet processing action by the packet processing program.

Example 31 includes the subject matter of any of Examples 25-30, and wherein: the one or more requested offload hints comprises a packet classification hint; to process the network packet comprises to match, by the network controller, the network packet against a flow rule, wherein the packet classification hint is indicative of the flow rule; to return the metadata comprises to return a match rule identifier, wherein the packet classification hint is indicative of the match rule identifier; and to perform the packet processing action comprises to select the packet processing action as a function of the match rule identifier.

Example 32 includes the subject matter of any of Examples 25-31, and further comprising a plurality of instructions stored thereon that, in response to being executed, cause the computing device to: provide the requested offload hints to a driver of the computing device via a predetermined application programming interface (API); wherein to determine the hardware configuration comprises to determine the hardware configuration by the driver in response to providing the requested offload hints to the driver.

Example 33 includes the subject matter of any of Examples 25-32, and wherein to return the metadata to the processor comprises to include the metadata in a receive descriptor.

Example 34 includes the subject matter of any of Examples 25-33, and wherein to return the metadata to the processor comprises to copy the metadata to a packet buffer via a direct memory access operation.

Example 35 includes the subject matter of any of Examples 25-34, and wherein: the one or more requested offload hints comprises a hashing hint; to process the network packet comprises to generate, by the network controller, a hash value as a function of one or more fields of the network packet, wherein the hashing hint is indicative of the one of more fields; and to return the metadata comprises to return the hash value.

Example 36 includes the subject matter of any of Examples 25-35, and wherein: the one or more requested offload hints comprises a packet parsing hint; to process the network packet comprises to identify, by the network controller, a packet header offset of a packet header in the network packet, wherein the packet parsing hint is indicative of the packet header; and to return the metadata comprises to return the packet header offset.

What is claimed is:

1. At least one non-transitory machine-readable medium storing instructions for execution by at least one machine, the at least one machine to be associated with network interface controller hardware for use in association with computer circuitry, the computer circuitry for use in executing a Linux operating system, the Linux operating system, when executed, having a kernel, the instructions when executed by the at least one machine resulting in the at least one machine being configured for performance of operations comprising:
    configuring, at least in part, packet processing offload hardware of the network interface controller hardware, based upon requested offload data, to implement requested offload processing in association with incoming packet data, the requested offload data to be generated, at least in part, via use of an application programming interface (API), the requested offload data to be associated with at least one hardware configuration-related translation operation, the requested offload processing to be associated with at least one action to be performed in association with the incoming packet data;
    wherein:
        the requested offload processing is configurable, based upon the requested offload data, to comprise one or more of:
            packet classification offload processing;
            packet header data matching offload processing;
            packet data flow rule matching offload processing;
            traffic shaping offload processing; and/or
            packet data policing offload processing;
        the at least one action is configurable to comprise one or more of:
            at least one packet encapsulation/de-encapsulation operation related to the incoming packet data;
            dropping the incoming packet data; and/or
            forwarding the incoming packet data;
        when the computer circuitry is in operation:
            the packet processing offload hardware of the network interface controller hardware is to implement the requested offload processing in association with the incoming packet data; and
            the configuring, at least in part, of the packet processing offload hardware of the network interface controller hardware is to be implemented, at least in part, by at least one device driver in association with runtime loading of compiled file data to be executed via the kernel; and
        the at least one device driver is to be associated with the network interface controller hardware.

2. The at least one non-transitory machine-readable medium of claim 1, wherein:
    the network interface controller hardware comprises an application specific integrated circuit (ASIC) for use in association with the requested offload processing.

3. The at least one non-transitory machine-readable medium of claim 2, wherein:
the network interface controller hardware is for use in association with Ethernet protocol communication.

4. The at least one non-transitory machine-readable medium of claim 3, wherein:
the compiled file data is to be generated by a compiler to be executed by the computer circuitry.

5. The at least one non-transitory machine-readable medium of claim 4, wherein:
the compiled file data is to be generated based upon linkable binary data to be generated by the computer circuitry.

6. Network interface controller hardware for use in association with computer circuitry, the computer circuitry for use in executing a Linux operating system, the Linux operating system, when executed, having a kernel, the network interface controller hardware comprising:
packet processing offload hardware to be configured, at least in part, based upon requested offload data, to implement requested offload processing in association with incoming packet data, the requested offload data to be generated, at least in part, via use of an application programming interface (API), the requested offload data to be associated with at least one hardware configuration-related translation operation, the requested offload processing to be associated with at least one action to be performed in association with the incoming packet data;
wherein:
the requested offload processing is configurable, based upon the requested offload data, to comprise one or more of:
packet classification offload processing;
packet header data matching offload processing;
packet data flow rule matching offload processing;
traffic shaping offload processing; and/or
packet data policing offload processing;
the at least one action is configurable to comprise one or more of:
at least one packet encapsulation/de-encapsulation operation related to the incoming packet data;
dropping the incoming packet data; and/or
forwarding the incoming packet data;
when the computer circuitry is in operation:
the packet processing offload hardware of the network interface controller hardware is to implement the requested offload processing in association with the incoming packet data; and
configuring, at least in part, of the packet processing offload hardware of the network interface controller hardware is to be implemented, at least in part, by at least one device driver in association with runtime loading of compiled file data to be executed via the kernel; and
the at least one device driver is to be associated with the network interface controller hardware.

7. The network interface controller hardware of claim 6, wherein:
the network interface controller hardware comprises an application specific integrated circuit (ASIC) for use in association with the requested offload processing.

8. The network interface controller hardware of claim 7, wherein:
the network interface controller hardware is for use in association with Ethernet protocol communication.

9. The network interface controller hardware of claim 8, wherein:
the compiled file data is to be generated by a compiler to be executed by the computer circuitry.

10. The network interface controller hardware of claim 9, wherein:
the compiled file data is to be generated based upon linkable binary data to be generated by the computer circuitry.

11. A method to be implemented using network interface controller hardware, the network interface controller hardware for use in association with computer circuitry, the computer circuitry for use in executing a Linux operating system, the Linux operating system, when executed, having a kernel, the method comprising:
configuring, at least in part, packet processing offload hardware of the network interface controller hardware, based upon requested offload data, to implement requested offload processing in association with incoming packet data, the requested offload data to be generated, at least in part, via use of an application programming interface (API), the requested offload data to be associated with at least one hardware configuration-related translation operation, the requested offload processing to be associated with at least one action to be performed in association with the incoming packet data;
wherein:
the requested offload processing is configurable, based upon the requested offload data, to comprise one or more of:
packet classification offload processing;
packet header data matching offload processing;
packet data flow rule matching offload processing;
traffic shaping offload processing; and/or
packet data policing offload processing;
the at least one action is configurable to comprise one or more of:
at least one packet encapsulation/de-encapsulation operation related to the incoming packet data;
dropping the incoming packet data; and/or
forwarding the incoming packet data;
when the computer circuitry is in operation:
the packet processing offload hardware of the network interface controller hardware is to implement the requested offload processing in association with the incoming packet data; and
the configuring, at least in part, of the packet processing offload hardware of the network interface controller hardware is to be implemented, at least in part, by at least one device driver in association with runtime loading of compiled file data to be executed via the kernel; and
the at least one device driver is to be associated with the network interface controller hardware.

12. The method of claim 11, wherein:
the network interface controller hardware comprises an application specific integrated circuit (ASIC) for use in association with the requested offload processing.

13. The method of claim 12, wherein:
the network interface controller hardware is for use in association with Ethernet protocol communication.

14. The method of claim 13, wherein:
the compiled file data is to be generated by a compiler to be executed by the computer circuitry.

15. The method of claim 14, wherein:
the compiled file data is to be generated based upon linkable binary data to be generated by the computer circuitry.

16. A data center for use in association with at least one network, the data center comprising:
multiple servers, one or more of the multiple servers to be communicatively coupled to the at least one network, the one or more of the multiple servers comprising:
network interface controller hardware comprising packet processing offload hardware; and
computer circuitry for use in association with the network interface controller hardware, the computer circuitry also for use in executing a Linux operating system, the Linux operating system, when executed, having a kernel;
wherein:
the packet processing offload hardware is to be configured, at least in part, based upon requested offload data, to implement requested offload processing in association with incoming packet data, the requested offload data to be generated, at least in part, via use of an application programming interface (API), the requested offload data to be associated with at least one hardware configuration-related translation operation, the requested offload processing to be associated with at least one action to be performed in association with the incoming packet data;
wherein:
the requested offload processing is configurable, based upon the requested offload data, to comprise one or more of:
packet classification offload processing;
packet header data matching offload processing;
packet data flow rule matching offload processing;
traffic shaping offload processing; and/or
packet data policing offload processing;
the at least one action is configurable to comprise one or more of:
at least one packet encapsulation/de-encapsulation operation related to the incoming packet data;
dropping the incoming packet data; and/or
forwarding the incoming packet data;
when the computer circuitry is in operation:
the packet processing offload hardware of the network interface controller hardware is to implement the requested offload processing in association with the incoming packet data; and
configuring, at least in part, of the packet processing offload hardware of the network interface controller hardware is to be implemented, at least in part, by at least one device driver in association with runtime loading of compiled file data to be executed via the kernel; and
the at least one device driver is to be associated with the network interface controller hardware.

17. The data center of claim 16, wherein:
the network interface controller hardware comprises an application specific integrated circuit (ASIC) for use in association with the requested offload processing.

18. The data center of claim 17, wherein:
the network interface controller hardware is for use in association with Ethernet protocol communication.

19. The data center of claim 18, wherein:
the compiled file data is to be generated by a compiler to be executed by the computer circuitry.

20. The data center of claim 19, wherein:
the compiled file data is to be generated based upon linkable binary data to be generated by the computer circuitry.

* * * * *